Aug. 14, 1923.
G. H. LELAND
ELECTRIC MOTOR
Filed March 10, 1920
1,464,911
2 Sheets-Sheet 2
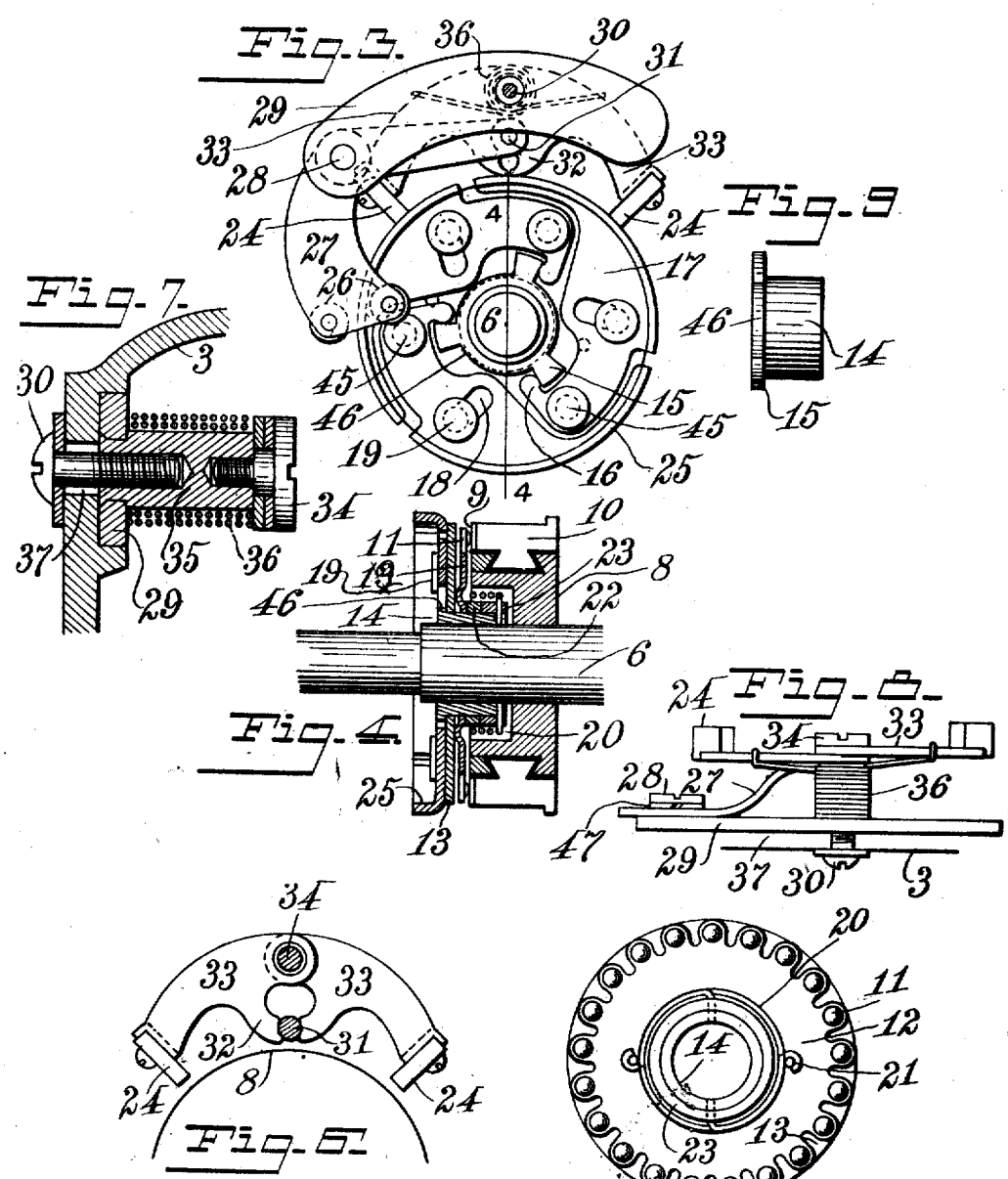

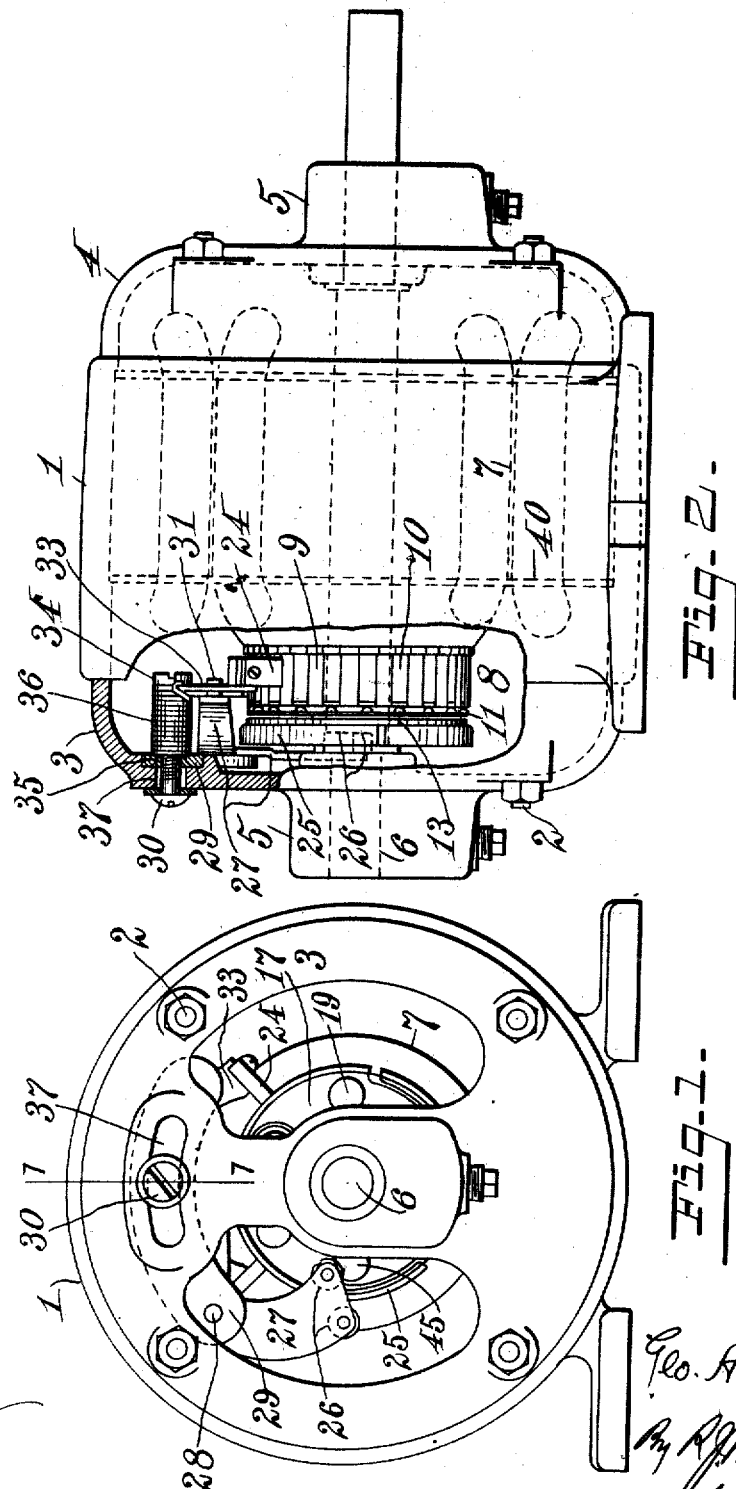

Patented Aug. 14, 1923.

1,464,911

UNITED STATES PATENT OFFICE.

GEORGE H. LELAND, OF DAYTON, OHIO.

ELECTRIC MOTOR.

Application filed March 10, 1920. Serial No. 364,746.

*To all whom it may concern:*

Be it known that I, GEORGE H. LELAND, a citizen of the United States, residing at Dayton, in the county of Montgomery and State of Ohio, have invented certain new and useful Improvements in Electric Motors, of which the following is a specification.

This invention relates to new and useful improvements in dynamo electric machines and has special reference to single-phase alternating current motors of the repulsion starting and induction running type.

One object of the invention is to provide in a motor means controlled by the rotation of the armature to automatically move the brushes out of contact with the commutator.

Another object of the invention is to provide in a motor means controlled by the rotation of the armature for short circuiting of the armature and for moving the brushes out of contact with the commutator.

Other objects of the invention will appear as the device is described in detail.

Referring to the accompanying drawings, Fig. 1 is an end elevation of a motor constructed in accordance with my invention; Fig. 2 is a side elevation thereof partially in section; Fig. 3 is a detailed elevation of the brush actuating mechanism; Fig. 4 is a section on the line —4—4— of Fig. 3; Fig. 5 is a view of the commutator short-circuiting device; Fig. 6 is a view of the brush holders in an elevated position; Fig. 7 is a section on the line —7—7— of Fig. 1; Fig. 8 is a plan view of the brush supporting means; Fig. 9 is a detail view of the short-circuiting sleeve.

In these drawings I have illustrated one embodiment of my invention and as here shown, referring more particularly to Figs. 1 and 2, —1— represents a motor casing to which is attached by means of bolts —2—, end caps —3— and —4—. The caps —3— and —4— are provided with bearings —5— which receive a shaft —6— of the armature —7— which is provided with a commutator —8—. Suitable means are provided for automatically short circuiting the armature and this means preferably comprises a device mounted at the end of the commutator for movement into short circuiting contact therewith. In the present instance the short circuiting device rotates in a fixed plane and I have shown the commutator 8 as provided with alternate extended bars —9— and intermediate shorter bars —10—. The extended bars —9— are adapted to be engaged by projections —11— of a short-circuiting brush or plate —12— mounted on a disc —13— freely journaled on a sleeve —14— attached to the shaft —6—. (See also Figs. 3, 4, and 5). The plate —12— may be insulated, if desired, from the shaft and adjacent parts in any well known manner. The said sleeve —14— is provided with projections —15— engaged by ends —16— of fly-weight levers —17— pivoted at —45— to the disc —13—. The levers —17— are provided with guide slots —18— which receive pins —19—. When the shaft —6— gains speed, the levers —17— move outwardly under the action of centrifugal force, which rocks the disc —13— and the plate —12—, thereby moving the projections —11— into contact with the elongated bars —9— and short-circuiting the armature. During this operation, the sleeve —14— and projections —15— are relatively stationary and the levers —17— partially rotate with the disc —13—. The parts are returned to a normal position, with the projections —11— lying opposite the shorter bars —10—, by springs —20— one end of which is attached to the sleeve —14— and the other end of which is attached to pins —21— which are also instrumental in securing the plate —12— to the disc —13—. The sleeve —14— is provided with a loose anti-friction sleeve —22— (Fig. 4) for the springs —20—. The disc —13—, the plate —12—, and the anti-friction sleeve —22—, are held on the sleeve —14— by a flange —46— at one end and by a tight ring —23— at the other. The above described short circuiting mechanism, with the exception of the antifriction sleeve 22 is substantially similar to that shown and described in my Patent No. 1,385,838 of July 26, 1921, and it will be understood that it is here shown for the purposes of illustration only and that other suitable short circuiting devices may be substituted therefor.

The commutator —8— is provided with brushes —24—, which bear radially thereon, and are movable into and out of contact with the commutator, and automatic means are provided for moving the same out of contact with the commutator when the motor gains speed. In the construction here illustrated the fly-weight levers —17— are provided with circumferential flanges —25— which are adapted to engage anti-friction pins —26— on the lower end of a bell-crank lever —27—. The said lever —27— is pivoted at —28— and said pivot is provided with a spring-friction washer —47—. The pivot —28— is at one end of a sliding support —29— mounted in the end cap —3— and secured thereto by a screw —30—. The end of the lever —27—, opposite the pins —26—, is provided with a pin —31— adapted to engage cam projections —32— of brush holders —33—. The brush holders —33— support the brushes —24— and are pivoted at —34— (Fig. 7) to a projection —35— extending from the support —29—. The holders —33— are provided with a duplex spring —36— adapted to move the brushes —24— into and to hold them in engagement with the commutator, the brushes being moved in the opposite direction, or away from the commutator, by the pin —31—. It will be seen that, when the fly-levers —17— move outwardly, under the action of centrifugal force, the flanges —25— will engage one of the pins —26—, which rocks the lever —27— and brush holders —33—, thereby moving the brushes —24— out of engagement with the commutator. When the motor is stopped and the speed thereof decreases, the flanges —25— will engage the other of the pins —26— which moves the pin —31— out of engagement with the projections —33—, thereby permitting the spring —36— to place the brushes in engagement with the commutator. As before stated the suport —29— is slidable, and for this purpose the screw —30— passes through a slot —37— in the cap —3—. This construction permits the brushes to be shifted or rocked off center, their position on either side determining the direction of rotation of the armature, as is well known in the art. By thus constructing a brush-elevating mechanism, automatic means are provided for elevating the brushes when the motor is operating by induction, thereby eliminating brush friction load, brush noise, and the wear on the brushes and frequent renewals thereof.

While I have shown and described one embodiment of my invention I wish it to be understood that I do not desire to be limited to the details thereof as various modifications may occur to a person skilled in the art.

Having described my invention, I claim;

1. In an electric motor, a commutator, brushes bearing radially thereon, pivotal arms to support said brushes for movement toward and from said commutator, a lever separate from but operatively connected with said arms, weights mounted at the end of said commutator for rotation therewith, and movable relatively to said commutator about axes parallel with the axis of said commutator, and means for operatively connecting said weights with said lever.

2. In an electric motor, a commutator, brushes bearing radially thereon, pivotal arms to support said brushes for movement toward and from said commutator, said arms each having a contact portion, a lever having a part movable relatively to said arms, and arranged to engage said contact portions thereof to simultaneously actuate said arms, weights mounted at the end of said commutator for rotation therewith and movable relatively to said commutator about axes parallel with the axis of said commutator, and means for operatively connecting said weights with said lever.

3. In an electric motor, a commutator, brushes bearing radially thereon, pivotal arms to support said brushes for movement toward and from said commutator, a lever to actuate said arms, weights mounted at the end of said commutator for rotation therewith and movable about axes parallel with the axis of said commutator, said weights having pivotal flanges, and projections carried by said lever and arranged to embrace said flanges, whereby the movement of said weights about said axes will actuate said lever.

4. In an electric motor, a commutator, brushes bearing radially thereon, pivotal arms provided with cam projections and supporting said brushes, a lever adapted to engage said cam projections to actuate said arms and elevate said brushes, and centrifugally actuated devices controlling said lever.

5. In an electric motor, a commutator having a part of its segments elongated, brushes bearing radially on said commutator, a short circuiting device movable into and out of operative relation with said elongated segments, and a centrifugally actuated device adapted to elevate said brushes and to place said short circuiting device in operative relation with said elongated segments.

6. In an electric motor, a commutator, brushes cooperating with said commutator and movable into and out of contact therewith, a short circuiting device mounted adjacent to the end of said commutator and rotatable into and out of short circuiting contact therewith, and a centrifugally actuated device to control the movements of said brushes and said short circuiting device relatively to said commutator.

7. In an electric motor, a commutator having a part of its segments elongated, a short circuiting device mounted at the end of said commutator for rotation in a fixed plane about the axis of said commutator to move the same into and out of contact with said elongated segments, brushes cooperating with said commutator and movable into and out of contact therewith, and a centrifugally actuated device operatively connected with said short circuiting device and said brushes.

8. In an electric motor, a commutator, brushes bearing radially thereon, pivotal arms provided with cam projections and supporting said brushes, an element adapted to cam said projections to elevate said brushes, a short circuiting device for said commutator operated by centrifugal weights which move outward in the plane of their rotation and which are provided with circumferential flanges adapted to operate said camming element, said weights thus controlling both the short circuiting of the commutator and the engagement of the brushes therewith.

In testimony whereof I affix my signature.

GEORGE H. LELAND.